United States Patent
Lee et al.

(10) Patent No.: US 10,999,624 B2
(45) Date of Patent: May 4, 2021

(54) MULTIMEDIA DEVICE, VEHICLE INCLUDING THE SAME, AND BROADCAST LISTENING METHOD OF THE MULTIMEDIA DEVICE

(71) Applicants: Hyundai Motor Company, Seoul (KR); Kia Motors Corporation, Seoul (KR)

(72) Inventors: Hyunwoo Lee, Gyeonggi-do (KR); Daebong An, Gyeonggi-Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/173,432

(22) Filed: Oct. 29, 2018

(65) Prior Publication Data
US 2019/0191211 A1  Jun. 20, 2019

(30) Foreign Application Priority Data
Dec. 14, 2017  (KR) .......................... 10-2017-0172026

(51) Int. Cl.
*H04N 21/434* (2011.01)
*G06F 3/14* (2006.01)
(Continued)

(52) U.S. Cl.
CPC ......... *H04N 21/4345* (2013.01); *G06F 3/147* (2013.01); *G06F 3/1423* (2013.01);
(Continued)

(58) Field of Classification Search
CPC ......... H04N 21/4345; H04N 21/42209; H04N 21/41422; H04N 21/84; H04N 21/4263; H04N 21/4398; H04N 21/4622; H04N 21/4884; G06F 3/1423; G09G 2370/022; G09G 2370/16; G09G 2380/10
See application file for complete search history.

(56) References Cited

U.S. PATENT DOCUMENTS

| | | | |
|---|---|---|---|
| 6,374,219 B1* | 4/2002 | Jiang | G10L 15/187 704/255 |
| 6,542,200 B1* | 4/2003 | Barcy | H04N 21/42203 348/468 |
| 6,795,808 B1* | 9/2004 | Strubbe | H04N 21/4394 704/275 |
| 10,123,087 B1* | 11/2018 | Killick | H04N 21/482 |

FOREIGN PATENT DOCUMENTS

KR10-20120098161A  9/2012

*Primary Examiner* — Jefferey F Harold
*Assistant Examiner* — Alexander Boyd
(74) *Attorney, Agent, or Firm* — Mintz Levin Cohn Ferris Glovsky and Popeo, P.C.; Peter F. Corless (57) ABSTRACT

A multimedia device of a vehicle may include: a broadcast receiver configured to receive broadcast information of a plurality of channels from a radio signal; a controller configured to divide the received broadcast information into sound information and subtitle information, and to simultaneously output the sound and subtitle information; a sound outputter configured to output the divided sound information; and a display configured to display the divided subtitle information. The controller is further configured to determine electronic program guide (EPG) information of the radio signal, and to control the display so as to display a text-changeable channel according to the EPG information.

17 Claims, 9 Drawing Sheets

(51) Int. Cl.
*H04N 21/422* (2011.01)
*H04N 21/84* (2011.01)
*H04N 21/426* (2011.01)
*G06F 3/147* (2006.01)
*H04N 21/488* (2011.01)
*H04N 21/414* (2011.01)
*H04N 21/462* (2011.01)
*H04N 21/439* (2011.01)

(52) U.S. Cl.
CPC ..... *G06F 3/1454* (2013.01); *H04N 21/41422* (2013.01); *H04N 21/4263* (2013.01); *H04N 21/42209* (2013.01); *H04N 21/4398* (2013.01); *H04N 21/4622* (2013.01); *H04N 21/4884* (2013.01); *H04N 21/84* (2013.01); *G09G 2370/022* (2013.01); *G09G 2370/16* (2013.01); *G09G 2380/10* (2013.01)

(56) References Cited

U.S. PATENT DOCUMENTS

| | | | |
|---|---|---|---|
| 2006/0069548 A1* | 3/2006 | Matsuura | H04N 21/4341 704/200.1 |
| 2006/0100876 A1* | 5/2006 | Nishizaki | G10L 15/32 704/257 |
| 2012/0149318 A1* | 6/2012 | Nakayama | H04B 1/0007 455/158.2 |
| 2012/0321279 A1* | 12/2012 | Quan | H04N 21/235 386/239 |
| 2013/0239144 A1* | 9/2013 | Kurita | H04N 21/431 725/40 |
| 2015/0043745 A1* | 2/2015 | Juzswik | H04N 21/41422 381/86 |
| 2015/0371633 A1* | 12/2015 | Chelba | G10L 15/063 704/240 |
| 2016/0307562 A1* | 10/2016 | Zhao | G10L 15/22 |
| 2018/0143956 A1* | 5/2018 | Skarbovsky | G06F 17/24 |

* cited by examiner

MULTIMEDIA DEVICE, VEHICLE INCLUDING THE SAME, AND BROADCAST LISTENING METHOD OF THE MULTIMEDIA DEVICE

CROSS-REFERENCE TO RELATED APPLICATION

This application claims the benefit of priority to Korean Patent Application No. 10-2017-0172026, filed on Dec. 14, 2017 in the Korean Intellectual Property Office, the disclosure of which is incorporated herein by reference in its entirety.

BACKGROUND

1. Technical Field

Embodiments of the present disclosure relate to a multimedia device, a vehicle including the same, and a broadcast listening method of the multimedia device and, more particularly, to a multimedia device for acquiring broadcast information of a plurality of channels, a vehicle including the same, and a broadcast listening method of the multimedia device.

2. Description of the Related Art

Modern vehicles generally perform a variety of functions for the enhancement of user convenience relating to, for example, audio, video, navigation, air-conditioning control, seat control, illumination control, and so forth. In order to perform some of these functions, an audio device, a multimedia device, and a navigation device can be integrated into one system such as, for example, an audio-video-navigation (AVN) head unit.

AVN head units are typically embedded in a vehicle. The AVN head unit may provide a radio service for playing a radio program acquired via terrestrial radio signals, an audio service for playing a Compact Disc (CD) and the like, a video service for playing a digital versatile disc (DVD) and the like, and a navigation service for providing assisted navigation. The AVN head unit may output a screen image for providing the radio, audio, video, or navigation services.

With the rapid integration of information technology (IT) in vehicles, telematics terminals capable of providing telematics services have been implemented in the AVN head units. As such, the AVN head unit can receive external broadcast information, output the received broadcast information as video and/or audio data, and provide a driver and/or passengers with the resultant broadcast information through a front-seat display. Some AVN head units further include Rear Seat Entertainment (RSE) (including an independent rear-seat display and rear-seat dedicated earphone) such that passengers seated in the rear seats can also view and listen to the outputted information.

However, when the driver and passengers desire to simultaneously view and listen to broadcast data of different channels, conventional AVN head units have a disadvantage in that information of different channels is not divided into audio information and visual information. That is, the conventional AVN head unit is unable to acquire visual information and audio information regarding broadcast data of different channels. As a result, when the driver and passengers desire to use a broadcast service (e.g., a radio broadcast service) capable of providing only audio information, the conventional AVN head unit prevents the driver and passengers from simultaneously listening to and/or reading broadcast information of two or more channels.

SUMMARY

Therefore, it is an aspect of the present disclosure to provide a multimedia device for acquiring broadcast information of a plurality of channels after dividing the broadcast information of the plurality of channels into audio information and video information when a driver and passengers desire to simultaneously listen to the broadcast information of the plurality of channels, a vehicle including the same, and a broadcast listening method of the multimedia device.

Additional aspects of the invention will be set forth in part in the description which follows and, in part, will be apparent from the description, or may be learned by practice of the invention.

In accordance with embodiments of the present disclosure, a multimedia device of a vehicle can include: a broadcast receiver configured to receive broadcast information of a plurality of channels from a radio signal; a controller configured to divide the received broadcast information into sound information and subtitle information, and to simultaneously output the sound and subtitle information; a sound outputter configured to output the divided sound information; and a display configured to display the divided subtitle information. The controller may be further configured to determine electronic program guide (EPG) information of the radio signal, and to control the display so as to display a text-changeable channel according to the EPG information.

The broadcast receiver may include a multi-radio tuner configured to receive the EPG information from the radio signal; and a communication modem configured to receive EPG broadcast information from a server, when the EPG information is not present in the radio signal.

The multi-radio tuner may include a plurality of radio tuners configured to receive/output a radio signal corresponding to a selected channel through an antenna.

The communication modem may receive EPG information regarding all current broadcast channels from the server over 3G, LTE, and/or a Wi-Fi network.

The controller may convert the radio signal into a digital signal, and may convert the digital signal into text data using at least one of a sound model, a silence separation model, and a language model.

The sound outputter may include a speaker or an earphone terminal.

The display may include: a front-seat display installed at a front of the vehicle; and/or a rear-seat display installed at a rear of the vehicle.

The multimedia device may further include an inputter configured to select a specific channel displayed on the display. The controller may analyze broadcast information of all channels other than the selected channel while the sound outputter simultaneously outputs sound information of the selected channel.

When the text-changeable channel is selected by a user through the inputter, the controller may convert a sound signal received from the selected channel into text data, and to control the display so as to sequentially display the text data.

Furthermore, in accordance with embodiments of the present disclosure, a vehicle can include: a broadcast receiver configured to receive broadcast information of a plurality of channels from a radio signal; a controller configured to divide the received broadcast information into sound information and subtitle information, and to simultaneously output the sound and subtitle information; a sound outputter configured to output the divided sound information; and a display configured to display the divided subtitle information. The controller may be further configured to determine electronic program guide (EPG) information of the radio signal, and to control the display so as to display a text-changeable channel according to the EPG information.

Furthermore, in accordance with embodiments of the present disclosure, a method for controlling a multimedia device of a vehicle may include: receiving broadcast information of the plurality of channels from a radio signal via a broadcast receiver; dividing the received broadcast information into sound information and subtitle information; simultaneously outputting the sound and subtitle information; outputting the divided sound information via a sound outputter; displaying the divided subtitle information via a display; determining electronic program guide (EPG) information of the radio signal; and displaying a text-changeable channel according to the EPG information via the display.

The receiving of the broadcast information may include: receiving the EPG information from the radio signal via a multi-radio tuner; and receiving EPG broadcast information from a server over a network when the EPG information is not present in the radio signal.

The method may further include: converting the radio signal into a digital signal; and converting the digital signal into text data using at least one of a sound model, a silence separation model, and a language model.

The converting of the digital signal into the text data may include: converting the converted digital signal into a phonetic symbol; searching for a silent portion of the phonetic signal; isolating words and sentences from one another in the of the phonetic signal according to the search for the silent portion of the phonetic signal; collecting the phonetic signal, isolated words, isolated sentences isolation into one phonetic datum; converting the phonetic datum into the text data using the EPG information; and outputting the text data via the display.

BRIEF DESCRIPTION OF THE DRAWINGS

These and/or other aspects of the invention will become apparent and more readily appreciated from the following description of the embodiments, taken in conjunction with the accompanying drawings of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Reference will now be made in detail to the embodiments of the present disclosure, examples of which are illustrated in the accompanying drawings, wherein like reference numerals refer to like elements throughout.

The terms used in the present application are merely used to describe specific embodiments and are not intended to limit the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

A multimedia device, a vehicle including the same, and a broadcast listening method of the multimedia device according to embodiments of the present disclosure will hereinafter be described with reference to the attached drawings.

Figure 1:
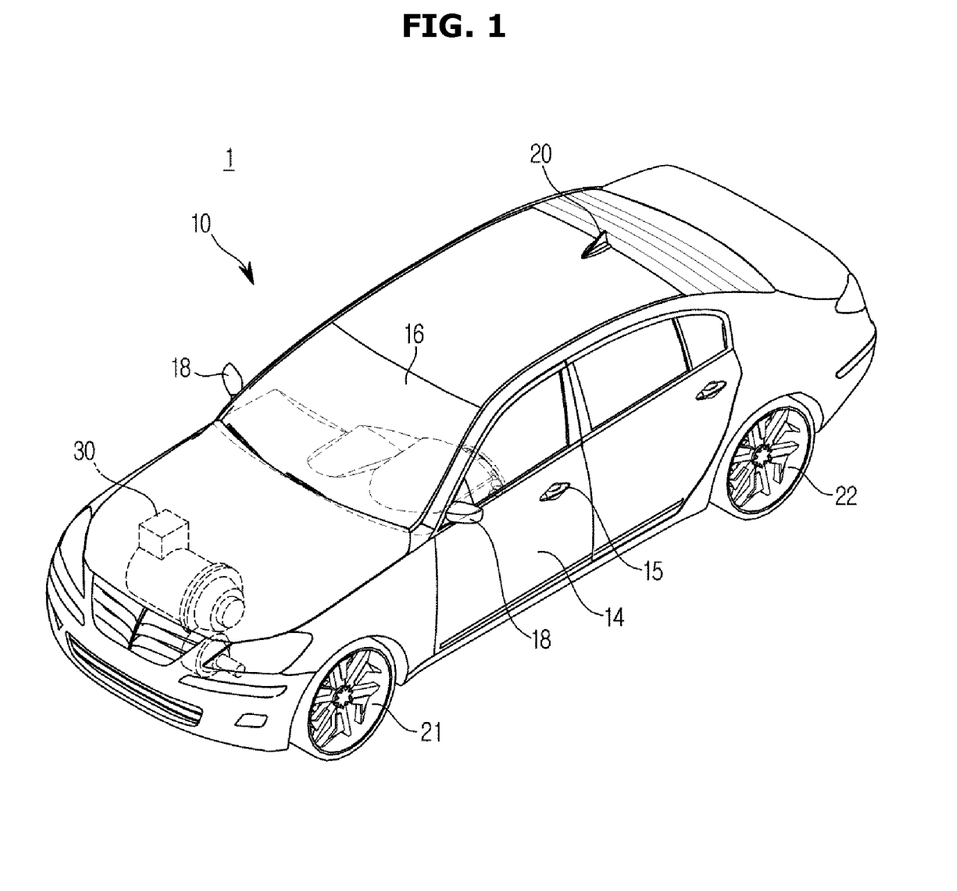
FIG. 1 is a view illustrating the exterior of a vehicle according to embodiments of the present disclosure.

FIG. 1 is a view illustrating the exterior of a vehicle 1 according to embodiments of the present disclosure.

As shown in FIG. 1, the vehicle 1 according to embodiments of the present disclosure includes a body 10 forming the exterior of the vehicle 1, doors 14 to shield an indoor space of the vehicle 1 from the outside, a windshield 16 to provide a forward view of the vehicle 1 to a vehicle driver who rides in the vehicle 1, side-view mirrors 18 to provide a rear view of the vehicle 1 to the vehicle driver, vehicle wheels 21 and 22 to move the vehicle 1 from place to place, and a drive device 30 to rotate the vehicle wheels 21 and 22.

The doors 14 are rotatably provided at the right and left sides of the body 10 so that a vehicle driver can ride in the vehicle 1 when any of the doors 14 is open and an indoor space of the vehicle 1 can be shielded from the outside when the doors 14 are closed. The doors 14 may be locked or unlocked by door handles 15. The door handles 15 may be locked or unlocked by the vehicle driver who directly operates a button or lever by approaching the vehicle 1, or may be remotely locked or unlocked by a remote controller, etc. at a remote site distant from the vehicle 1.

The windshield 16 is provided at a front upper portion of the body 10 so that a vehicle driver who rides in the vehicle 1 can obtain visual information of a forward direction of the vehicle 1. The windshield 16 may also be referred to as a windshield glass.

The side-view mirrors 18 may include a left side-view mirror provided at the left of the body 10 and a right side-view mirror provided at the right of the body 10, so that the driver who rides in the vehicle 1 can obtain visual information of the lateral and rear directions of the vehicle 1.

Besides, the vehicle 1 may include an antenna 20 provided at a top surface of the body 10.

The antenna 20 may receive broadcast/communication signals, for example, telematics signal, radio signal, DMB signal, digital TV signal, GPS signal, etc. The antenna 20 may be a multi-functional antenna configured to receive various kinds of broadcast/communication signals, or may be a single functional antenna configured to receive any one of broadcast/communication signals.

The wheels 21 and 22 may include front wheels 21 provided at the front of the body 10 and rear wheels 22 provided at the rear of the body 10. The drive device 30 may provide rotational force to the front wheels 21 or the rear wheels 22 in a manner that the body 10 moves forward or backward. The drive device 30 may include an engine to generate rotational force by burning fossil fuels or a motor to generate rotational force upon receiving power from a battery.

The vehicle 1 according to embodiments of the present disclosure may be classified into an internal combustion vehicle (general engine vehicle), a hybrid electric vehicle, and a Fuel Cell Electric Vehicle (FCEV).

It is understood that the exterior of the vehicle 1, as described above and illustrated in FIG. 1, is provided for demonstration purposes and does not limit the scope of the present disclosure.

Figure 2:
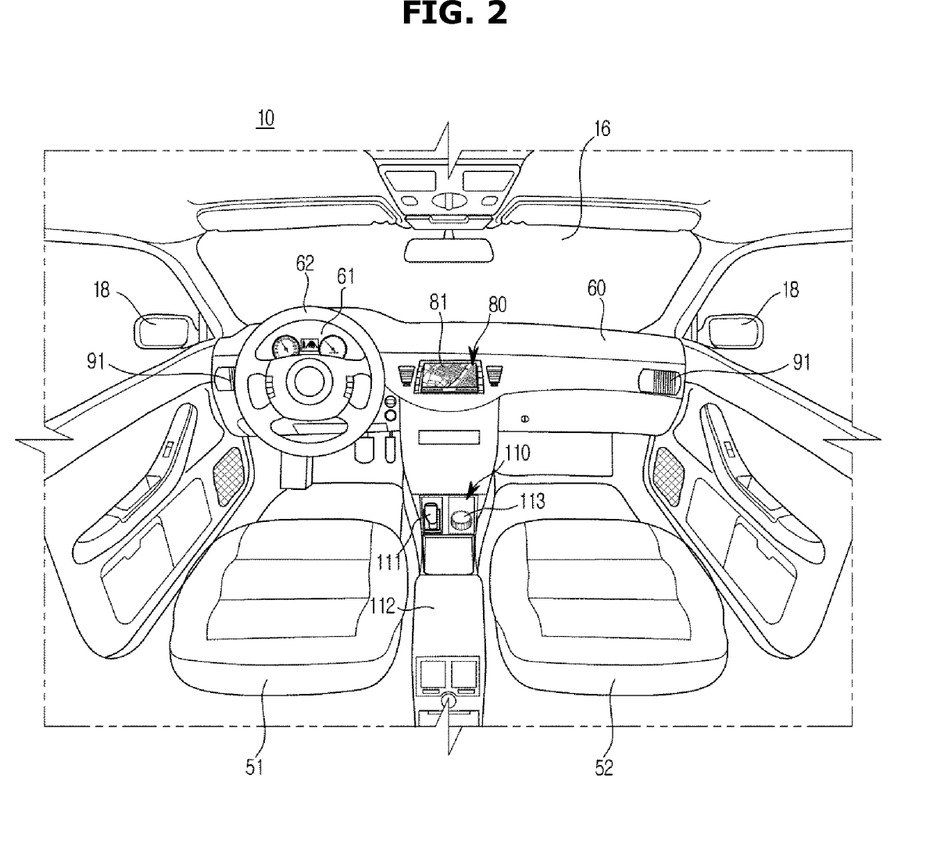
FIG. 2 is a view illustrating the interior of the vehicle according to embodiments of the present disclosure.

FIG. 2 is a view illustrating the interior of the vehicle 1 according to embodiments of the present disclosure.

As shown in FIG. 2, the interior of the vehicle 1 may include seats 51 and 52 on which passengers of the vehicle 1 sit, a steering wheel 62 mounted to the driver seat 51 on which a driver from among the passengers sits, a cluster 61 mounted to a front portion of the body 10 from the steering wheel 62 and displaying operation information of the vehicle 1, and a dashboard 60 to which various devices connected to the cluster 61 to manipulate the vehicle 1 are mounted.

In more detail, the dashboard 60 may protrude from a lower portion of the windshield 16 toward the seats 51 and 52, such that the vehicle driver who looks forward can manipulate various devices mounted to the dashboard 60.

For example, various devices mounted to the dashboard 60 may include an Audio-Video-Navigation (AVN) device 80 mounted to a center fascia corresponding to the center region of the dashboard 60, an air outlet 91 of an air conditioner (not shown) mounted to a side surface of a touchscreen 81 of the AVN device 80, and various input devices mounted to a lower portion of the AVN device 80.

The AVN head unit 80 (also referred to as a "vehicle multimedia device") in which an audio/video (AV) device and a navigation device embedded in the vehicle 1 are integrated into one system is designed. The AVN head unit 80 may provide a radio service for reproducing a radio program on the basis of terrestrial radio signals, an audio service for reproducing a Compact Disc (CD) and the like, a video service for reproducing a digital versatile disc (DVD) and the like, a navigation service for providing a navigation function, and a phone service for controlling information as to whether a mobile phone connected to the vehicle 1 receives a phone call from another party. In addition, the AVN head unit 80 may also provide a voice recognition service upon receiving a voice signal instead of a user manipulation signal, and the voice recognition service may provide a radio service, an audio service, a video service, a navigation service, and a phone call service.

The AVN head unit 80 may be installed at the top of the dashboard 60, and may be embedded in the center console. In this case, only a touchscreen 81 for displaying a touchscreen image from among constituent elements of the AVN head unit 80 may be exposed to the outside.

The user may receive the radio service, the audio service, the video service, and the navigation service through the AVN head unit 80.

In this case, the AVN head unit 80 may be referred to as a navigation terminal, and may be combined with the telematics terminal, such that the AVN head unit 80 may also be referred to by various terms well known to those skilled in the art as necessary.

The AVN head unit 80 may selectively display at least one of a radio screen image, an audio screen image, a video screen image, a navigation screen image, and a phone screen image through the touchscreen 81. In addition, the AVN head unit 80 may display various control screen images associated with control of the vehicle 1, may also display screen images associated with additional functions capable of being executed in the AVN head unit 80.

The touchscreen 81 may be implemented by any one of a Liquid Crystal Display (LCD) panel, a Light Emitting Diode (LED) panel, an Organic Light Emitting Diode (OLED) panel, etc., without being limited thereto. The touchscreen 81 may perform a screen display function and an input function of instructions or commands.

The touchscreen 81 may output a screen image including predetermined images to the outside according to an operating system (OS) for driving/controlling the AVN head unit

80 and an application being executed in the AVN head unit 80, or may receive instructions or commands.

The touchscreen 81 may display a basic screen image according to the executed application. When touch manipulation is not performed, the touchscreen 81 may display the basic screen image.

The touchscreen 81 may also display a touch manipulation screen image according to situations. The touch manipulation screen may indicate a screen image capable of receiving the user's touch manipulation.

The touchscreen 81 may be any one of a resistive touchscreen which senses the user's touch manipulation by recognizing pressure, a capacitive touchscreen which senses the user's touch manipulation based on the effect of capacitive coupling, an optical touchscreen based on infrared light, or an ultrasonic touchscreen which uses ultrasound, without being limited thereto.

The touchscreen 81 may control the AVN head unit 80 embedded in the vehicle 1 to interact with the user, and may receive a user command through touch interaction or the like. Since characters or menus displayed on the touchscreen 81 are selected, the touchscreen 81 may receive a user command as an input.

The AVN device 80 may be connected to communication terminals, for example, a smartphone, a Portable Multimedia Player (PMP), an MPEG Audio Layer-3 (MP3) player, a Personal Digital Assistants (PDA), etc. through Wireless Fidelity (Wi-Fi) or Bluetooth pairing, and may reproduce audio and video files as necessary.

The air outlet 91 of the air conditioner (not shown) may be provided to both sides of the touchscreen 81 of the dashboard 60. The air conditioner may automatically control the air-conditioning environment (including indoor/outdoor environmental conditions of the vehicle 1, air intake/exhaust process, air circulation, cooling/heating, etc.), or may control the air-conditioning environment in response to a control command of the user.

For example, the air conditioner may perform heating and cooling of the air, and may discharge the heated or cooled air through the air outlet 91, thereby controlling a temperature of the indoor space of the vehicle 1.

The driver or passenger may control the air conditioner to adjust the temperature of the internal space of the body 10, before the driver or passenger gets in the vehicle 1.

Meanwhile, the interior of the vehicle 1 may include a center console 110 disposed between the seats 51 and 52, and a tray 112 connected to the center console 110. The center console 110 may include a gear lever 111 and a jog-wheel or various key-types of input buttons 113, without being limited thereto.

It is understood that the interior of the vehicle 1, as described above and illustrated in FIG. 2, is provided for demonstration purposes and does not limit the scope of the present disclosure.

Figure 3:
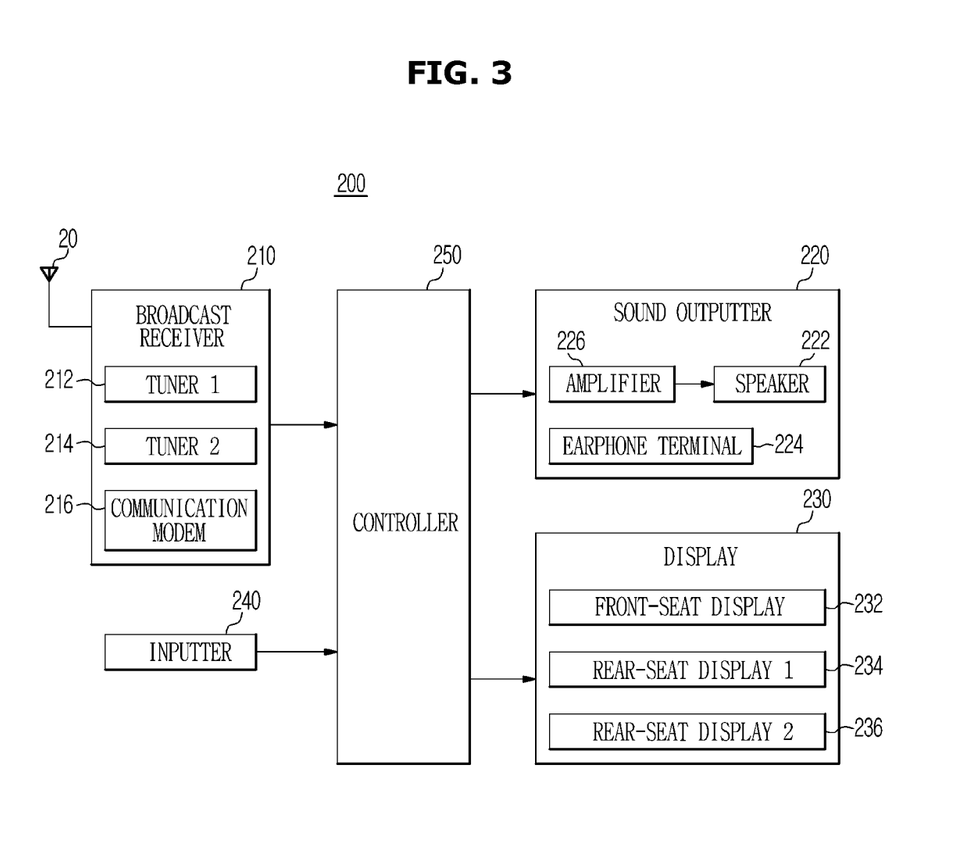
FIG. 3 is a block diagram illustrating a multimedia device embedded in the vehicle according to embodiments of the present disclosure.

FIG. 3 is a block diagram illustrating a multimedia device embedded in the vehicle according to embodiments of the present disclosure.

As shown in FIG. 3, the multimedia device 200 may include a broadcast receiver 210, a sound outputter 220, a display 230, an inputter 240, and a controller 250.

The broadcast receiver 210 may receive broadcast information transmitted in the form of radio waves from an external broadcast management server (not shown), through the antenna.

The broadcast management server may modulate a broadcast signal, and may emit the modulated broadcast signal using radio waves having a predefined frequency. Radio waves used to emit broadcast signals may include short waves, medium waves, or microwaves.

In this case, the broadcast management server may transmit broadcast signals of a plurality of broadcast channels using different frequencies. In this case, the broadcast channel may include a satellite channel, a terrestrial channel, etc., and may denote a unit of broadcast signals that are provided in the form of a successive stream or information system through the same frequency band. The respective broadcast signals of the plurality of channels may be transmitted through radio waves having different frequencies. The broadcast receiver 210 may selectively receive only a broadcast signal to be transmitted by radio waves having a specific frequency, from among the plurality of transmitted (Tx) broadcast signals according to predefined setting or user manipulation.

The broadcast signal may include not only a TV broadcast signal, a radio broadcast signal, and a data broadcast signal, but also a broadcast signal obtained by a combination of the data broadcast signal and any one of the TV broadcast signal and the data broadcast signal. Broadcast associated information may denote a broadcast channel, a broadcast information program, and/or a broadcast service provider. The broadcast associated information may be configured in various formats. For example, the broadcast associated information may be configured in the form of an Electronic Program Guide (EPG) of Digital Multimedia Broadcasting (DMB) or an Electronic Service Guide (ESG) of Digital Video Broadcast-Handheld (DVB-H).

In accordance with embodiments of the present disclosure, the broadcast receiver 210 may receive broadcast information of all channels from radio signals, and may include a multi-radio tuner configured to receive various radio broadcast signals and a communication modem 216 configured to receive Electronic Program Guide (EPG) broadcast information.

The multi-radio tuner may include a first radio tuner 212 and a second radio tuner 214, each of which receives EPG information through radio frequencies.

The communication modem 216 may receive EPG information of all current broadcast channels from the server through a network, when not receiving EPG information through radio frequencies. In this case, the communication modem 216 may provide a 3G communication function and a 4G communication function such as LTE.

The communication modem 216 may provide the 3G or 4G network according to a current standard communication protocol, and may provide various functions requisite for a more advanced network (e.g., 5G network) higher than the 3G or 4G network that is under discussion in the International Organization for Standardization (ISO).

The communication modem 216 may be connected to the antenna 20 (e.g., 3G/LTE antenna) mounted to the vehicle 1, and may receive EPG information regarding all the current broadcast channels from the EPG server through the antenna 20.

The sound outputter 220 may receive broadcast information (EPG information) from the broadcast receiver 210, and may output audio signals received from the received radio broadcast channel.

The sound outputter 220 may include a speaker 222 or an earphone terminal 224.

The speaker 222 may convert an electrical signal into an audio signal, and may output the converted audio signal to the outside of the multimedia device 200. The speaker 222 may further include a Digital to Analog Converter (DAC) to convert a digital electrical signal into an analog electric signal, and an amplifier 226 to amplify the analog electric signal received from the DAC, etc.

The display 230 may receive broadcast information (EPG information) from the broadcast receiver 210, and may display subtitles of the received radio broadcast channel.

The display 230 may include not only a front-seat display 232 (e.g., touchscreen of the AVN head unit) installed at the front of a vehicle, but also a first rear-seat display 234 (e.g., RSE) and a second rear-seat display 236 (e.g., RSE) installed at the rear of the vehicle 1.

The display 230 may be a user interface (UI) configured to receive a channel selection command from a user as well as to display broadcast channel information corresponding to the received channel selection command. For example, the user interface (UI) may be implemented as a Touch Screen Panel (TSP).

The display 230 may display not only images or pictures, but also index items, may display operational information (e.g., a current playing state or a subtitle displaying state of the speaker 222) of the corresponding broadcast channel, and may display not only DMB broadcast images, but also voice (audio) and music information of the radio broadcasting. In this case, the index item may denote a set of characters or letters. The characters marked on the index items may include symbols, numbers, special characters, etc. The characters indicating the index items may be Korean (Hangeul) (consonants, vowels), English, Japanese, etc.

Therefore, the passenger may select a desired broadcast channel to be displayed as subtitles, such that the passenger may view the subtitles through the display 230 embedded in the vehicle 1.

The inputter 240 may allow the passenger to select a desired broadcast channel or a specific item displayed on the display 230, and may be implemented as a mechanical button or touch input. In this case, the touch input may detect the presence or absence of touch interaction on the touch screen panel (TSP) mounted to the display 230, and may generate and output an electrical signal on the basis of the detected touch interaction. For example, the user (e.g., driver or passenger) may touch the TSP using the user's finger, hand, or a stylus pen. In addition, the touch interaction may be achieved by a touch means, for example, the user's finger, hand, a stylus pen, or the like.

The controller 250 may be used as a micro processor configured to control overall operation of the multimedia device 200, and may control various modules and devices embedded in the multimedia device 200. In accordance with embodiments of the present disclosure, the controller 250 may operate by an application processor embedded in the multimedia device 200, and may generate a control signal for controlling various modules and devices embedded in the multimedia device 200, such that the controller 250 may control operations of constituent elements using the control signal.

The controller 250 may include a memory to store programs for performing the aforementioned and following operations and various kinds of data associated with the programs, a processor to execute the programs stored in the memory, and a hydraulic control unit (HCU), a microcontroller unit (MCU), etc. each of which acts as a hydraulic control device. In this case, the memory may be implemented as a subtitle storing memory configured to store text data that has been converted using a language model database (DB) identical to a genre acquired from EPG broadcast information.

The controller 250 may be implemented as at least one of a flash memory type, a hard disk type, a multimedia card micro type, a card type memory (e.g. a Secure Digital (SD) memory or an eXtreme Digital (XD) memory), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, an optical disc, etc. However, the scope or spirit of the controller 250 according to embodiments of the present disclosure is not limited thereto, and may also be implemented as another format well known to those skilled in the art.

The controller 250 may use a Controller Area Network (CAN) of the vehicle 1. The CAN may refer to a network system to perform communication between electronic control units (ECUs) of the vehicle 1 as well as to control the ECUs. In more detail, the CAN may transmit data through a pair of twisted data lines or a pair of shield data lines shielded with a covering material. The CAN may operate according to multi-master principles in which each ECU for use in master/slave systems may operate as a master. The controller 250 may also perform data communication either through an in-vehicle wired network (for example, a Local Interconnect Network (LIN), Media Oriented System Transport (MOST), etc. of the vehicle 1) or through a wireless network such as a Bluetooth network.

In accordance with embodiments of the present disclosure, when the user selects a desired channel, the controller 250 may output audio signals received from the selected radio channel through the audio outputter 220 embedded in the vehicle 1. A detailed description thereof will hereinafter be given with reference to FIG. 4.

Figure 4:
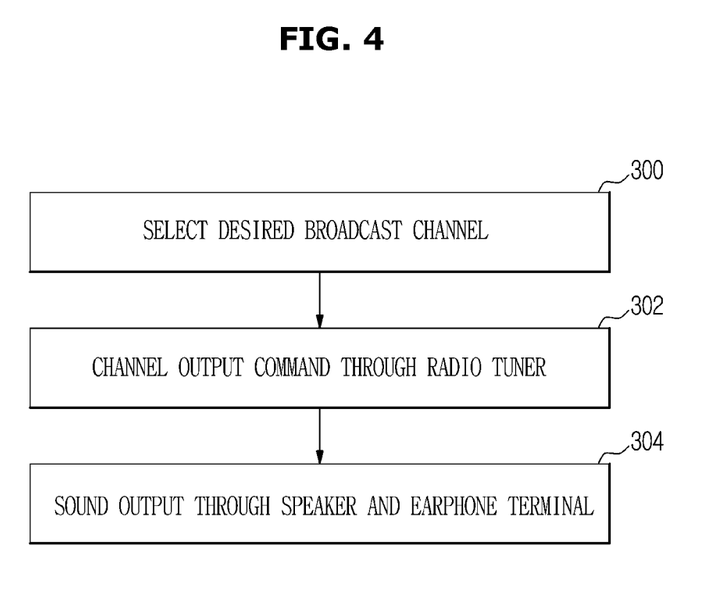
FIG. 4 is a flowchart illustrating a method for outputting sound information using the multimedia device according to embodiments of the present disclosure.

FIG. 4 is a flowchart illustrating a method for outputting sound information using the multimedia device according to embodiments of the present disclosure.

As shown in FIG. 4, when the user selects a desired broadcast channel through the inputter 240 (300), the controller may transmit an output command of the channel selected through the multi-radio tuners 212 and 214 (e.g., Radio Tuner 1) of the broadcast receiver 210 to the sound outputter 220 (302).

Therefore, the sound outputter 220 may output sound (or audio) signals from the corresponding broadcast channel through the speaker 222 or the earphone terminal 224 according to a sound control signal of the controller 250, such that the sound outputter 220 may allow the user to listen to the output audio signals (304).

In accordance with embodiments of the present disclosure, the controller 250 may convert sound signals received from the corresponding broadcast channel into subtitles, and may sequentially display the subtitles through the display 230 (including the front-seat display, the first rear-seat display, and the second rear-seat display).

For this purpose, the controller 250 may analyze broadcast information (EPG information) received from the broadcast receiver 210, may perform filtering of a channel (e.g., news, talk show, etc.) capable of being easily converted into subtitles according to the analyzed result, and may display the broadcast channel capable of being displayed as subtitles on the display 230, such that the controller 250 may inform the user or passenger of the fact that subtitles of the corresponding broadcast channel can be displayed.

Therefore, the user may select a desired broadcast channel to be converted into subtitles, and may view the subtitles of the selected broadcast channel through the display 230 embedded in the vehicle 1.

In accordance with embodiments of the present disclosure, when the user desires to view subtitles of a current listening channel or a current non-listening channel, the controller 250 may convert a sound (or voice) signal into a digital signal, may convert the digital signal into text data using a sound model, a silence separation model, and a language model, and may display the text data on the display 230.

Therefore, upon receiving a selection command from the user, the controller 250 may control information of a channel being audibly output through the sound outputter 220, to be displayed as subtitles through the display 230. A detailed description thereof will hereinafter be given with reference to FIG. 5.

Figure 5:
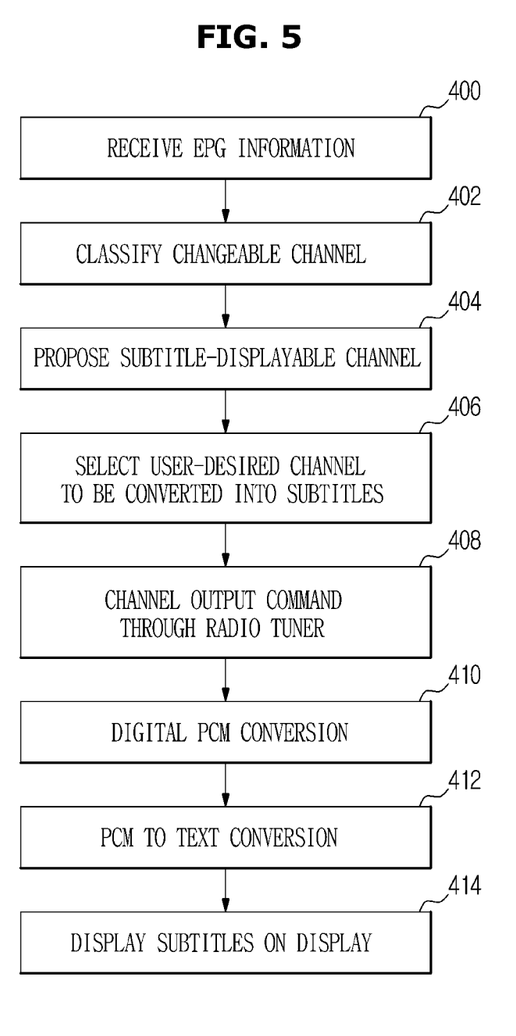
FIG. 5 is a flowchart illustrating a method for displaying subtitles of the multimedia device according to embodiments of the present disclosure.

FIG. 5 is a flowchart illustrating a method for displaying subtitles of the multimedia device according to embodiments of the present disclosure.

As shown in FIG. 5, the controller 250 may receive broadcast information (EPG) (400), and may perform filtering on a channel capable of being converted into subtitles from among all current broadcast channels (402).

Subsequently, the controller 250 may inform the user of the fact that the user can view subtitles of the corresponding channel (e.g., news, talk show, etc.) through the display 230 (404).

Therefore, when the user desires to view subtitles regarding a current listening channel or a current non-listening channel (406), the controller 250 may convert sound (e.g., speech) signals generated from the first radio tuner 212 or the second radio tuner 214 into a digital signal (408), may convert the digital signal into text data using the sound model, the silence separation model, and the language model, and may display the text data on the display 230 (410, 412, 414). A method for converting PCM (Pulse Code Modulation) corresponding to the digital signal into text data will hereinafter be described with reference to FIG. 8.

Referring again to FIG. 4, the controller 250 may control information of a channel being output to the speaker 222 or the earphone terminal 224, to be displayed as subtitles according to user selection.

As described above, if it is determined that the digital signal is music data having difficulty in subtitle conversion through a Support Vector Machine (SVM) pattern classifier configured to classify the digital signal into a speech and/or a music, the controller 250 may control subtitle data "Music Playing Now" to be displayed.

When the number of user-desired channels to be displayed as subtitles is set to N (plural number), N tuners are additionally configured, such that subtitles of the plurality of channels can be displayed on the display 230 in the same manner as described above.

Therefore, the passenger can finally view and listen to information regarding a plurality of broadcast channels (e.g., the passenger may listen to music broadcast information while simultaneously viewing news broadcast information).

When the user (e.g., driver of passenger) desires to view information of a current listening channel or a current non-listening channel using subtitles, the controller 250 may convert information of the current listening channel or the current non-listening channel into subtitles, and may output the subtitles on the display 230. When the vehicle is in motion according to driving regulations, the controller 250 may provide only the first rear-seat display 234 and the second rear-seat display 236 with subtitles.

Operations and effects of the multimedia device, the vehicle including the same, and the broadcast listening method of the multimedia device according to the embodiment of the present disclosure will hereinafter be described in detail.

A method for classifying subtitle-displayable channels of the multimedia device 200, and displaying the classified channels on the display 230 according to the embodiments of the present disclosure will hereinafter be described with reference to FIGS. 6 and 7.

Figure 6:
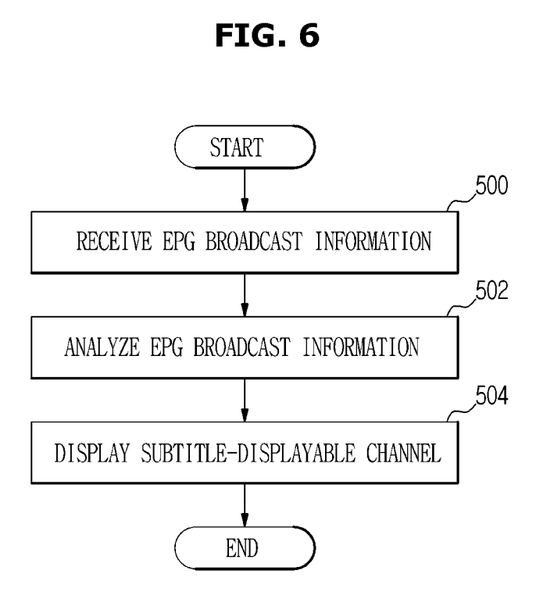
FIG. 6 is a flowchart illustrating a method for classifying channels so as to display subtitles of the multimedia device according to embodiments of the present disclosure.
Figure 7:
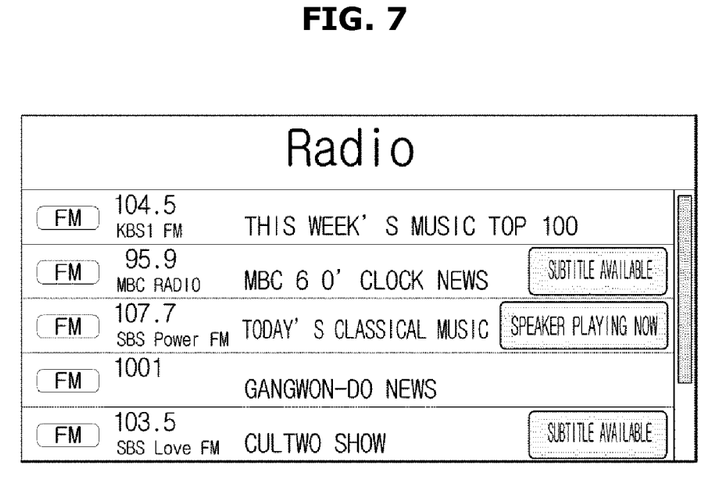
FIG. 7 is a view illustrating a display window of the multimedia device according to embodiments of the present disclosure.

FIG. 6 is a flowchart illustrating a method for classifying channels so as to display subtitles of the multimedia device according to embodiments of the present disclosure; and FIG. 7 is a view illustrating a display window of the multimedia device according to embodiments of the present disclosure.

As shown in FIG. 6, the broadcast receiver 210 may receive broadcast information of all channels from the radio signal. When EPG information is not present in the radio signal, the broadcast receiver 210 may receive current broadcast information from an EPG server (not shown) through the network (500).

Therefore, the controller 250 may analyze a genre to be easily displayed as subtitles, from among the broadcast information programs received from the broadcast receiver 210. When the broadcast program genre is news or talk show, the controller 250 may determine the analyzed genre to be a displayable frequency. In addition, the controller 250 may construct a subtitle displayable DB regarding all the broadcast programs, and may search for the constructed subtitle displayable DB. If the search result indicates a displayable channel (frequency), the controller 250 may recognize the presence of a displayable frequency (502).

Subsequently, as shown in FIG. 7, the controller 250 may output the subtitle displayable channel on the display 230 (504).

A subtitle processing method for displaying subtitles of the multimedia device 200 will hereinafter be described with reference to FIG. 8.

Figure 8:
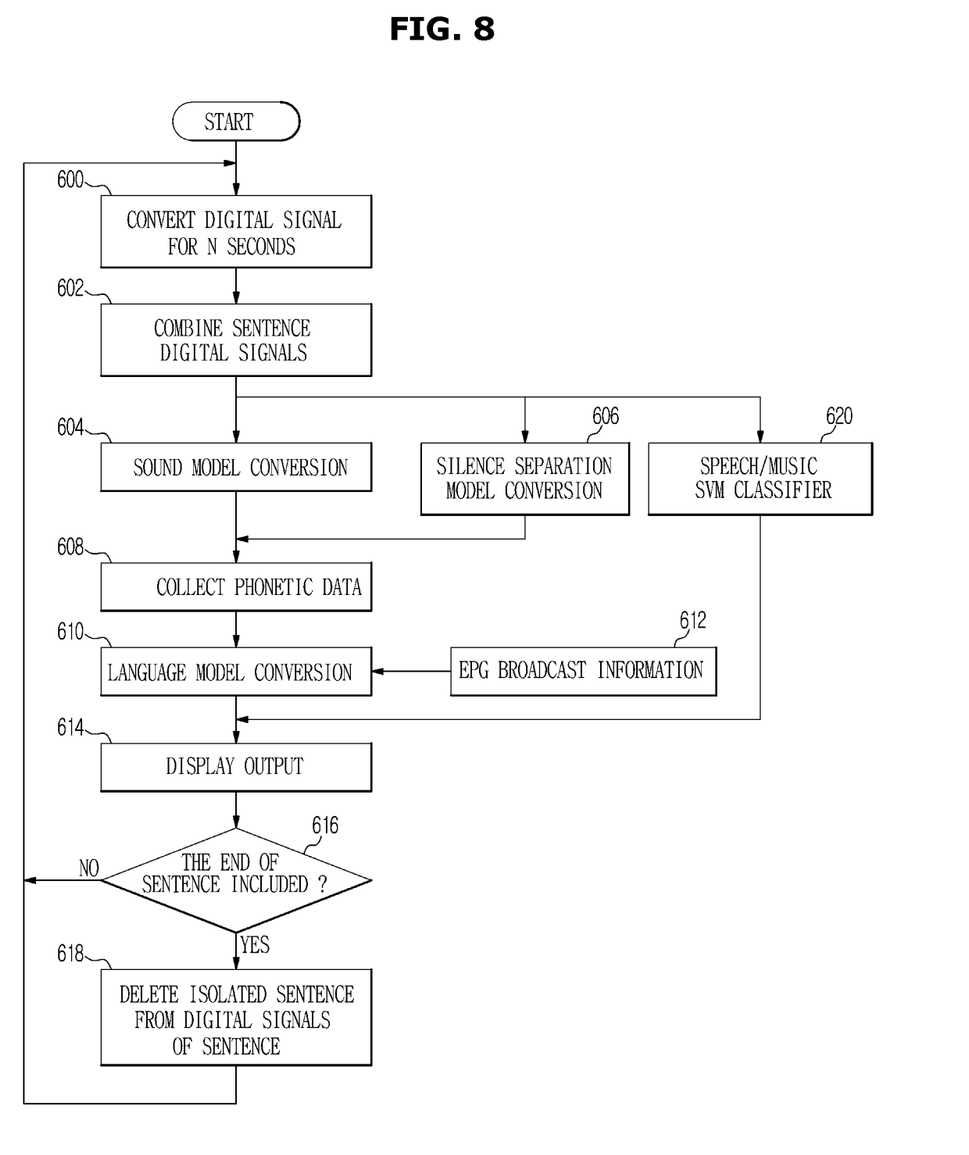
FIG. 8 is a flowchart illustrating a PCM-to-Text conversion process for displaying subtitles of the multimedia device according to embodiments of the present disclosure.

FIG. 8 is a flowchart illustrating a PCM-to-Text conversion process for displaying subtitles of the multimedia device according to embodiments of the present disclosure.

As shown in FIG. 8, the controller 250 may convert an analog signal of a specific radio channel into a PCM digital signal at intervals of N seconds so as to perform sound signal processing (600).

Subsequently, the controller 250 may combine a current digital signal buffer with the latest digital signal generated for N seconds (602), may analyze the combined digital signal, and may convert the combined digital signal into a phonetic symbol (604).

The controller 250 may find a silent portion of the digital signal having been converted in operation 600, may isolate words and sentences from one another (606), and may collect the phonetic symbol, word isolation, and sentence isolation into one phonetic datum (608).

Therefore, the controller 250 may convert one phonetic datum (obtained in operation 608) into text data using the language model DB identical to the genre obtained from the EPG broadcast information 612, and may store the text data in the subtitle storing memory (610). Here, the language model DB may denote a language model for converting phonetic data into a target language (Korean, English, etc.).

Therefore, the controller 250 may output text subtitles stored in the subtitle storing memory to the display 230 (614). In this case, if at least a portion of the subtitle storing memory is used by a predetermined level or higher, the controller 250 may sequentially delete subtitles arranged in the order of the oldest subtitles to the latest subtitles from the memory.

The controller 250 may determine whether the end of a sentence is contained in the latest text subtitles (616). When the end of the sentence is not contained in the latest text subtitles (616), the controller 250 may return to operation 600, and may then perform subsequent operations.

If the end of the sentence is contained in the latest text subtitles (616), the controller 250 may delete a sentence digital signal matched to the sentence end from among the entire sentence digital signals (618). The sentence digital signal is a FIFO buffer. If the sentence including the end of the sentence from among a First Input part is decided, the sentence digital signal is deleted from the buffer.

The controller 250 may determine whether a current sound signal from among the digital signal converted in operation 600 is a speech or music using the SVM (Support Vector Machine) classifier based on pattern recognition (620).

If the current audio signal is music (620), the controller 250 may determine that the music has difficulty in subtitle conversion, such that subtitles "Music Playing Now" may be displayed on the display 230, as an example.

If the current sound signal is speech (620), the controller 250 may determine that the current sound signal can be easily converted into subtitles, such that "Subtitle Playing Now" may be displayed on the display 230, as an example.

As a person listens to music and reads a book, he or she can often receive at least two kinds of information at the same time. When the user uses a television (TV), the TV can output multiple images and a single sound or voice signal using a PIP (Picture In Picture) technology such that the user can monitor various channels at the same time. In contrast, the corresponding technology cannot be applied to sources having only voice or sound signals in the same manner as in the radio broadcast program.

In accordance with embodiments of the present disclosure, the user or passenger can listen to and read broadcast information of at least two channels. A detailed description thereof will hereinafter be given with reference to FIG. 9.

Figure 9:
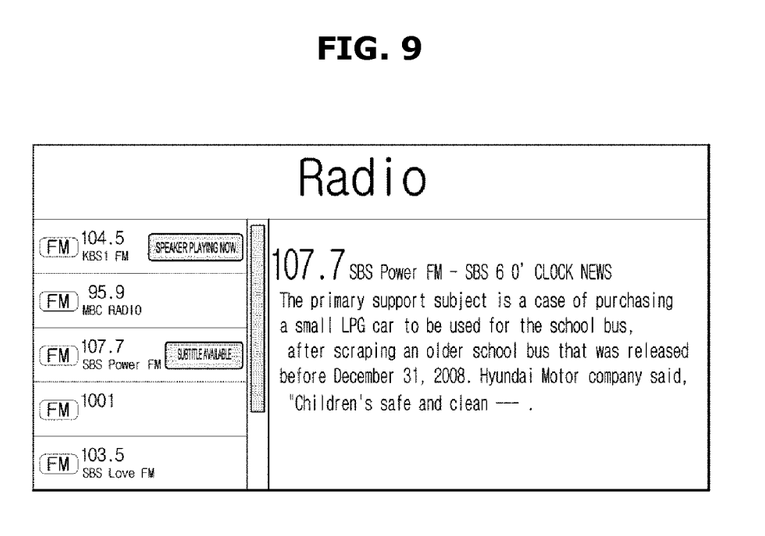
FIG. 9 is a view illustrating a display window through which subtitles of the multimedia device are reproduced according to embodiments of the present disclosure.

FIG. 9 is a view illustrating a display window through which subtitles of the multimedia device are reproduced according to embodiments of the present disclosure.

As shown in FIG. 9, the multimedia device according to embodiments of the present disclosure may allow the user to view and listen to a music broadcast program or a talk show, and at the same time may convert a news broadcast program into text data, such that the user can view the text data through the multimedia device while simultaneously viewing and listening to music or a talk show. In order to minimize the number of unrecognizable subtitles due to errors caused by limitations of the speech recognition dictation technology, the multimedia device may analyze a channel to be easily converted into text data on the basis of EPG broadcast information, and may provide the passenger with a proposal message for querying whether to display the analyzed result, resulting in increased accuracy of subtitles indicating text data.

The multimedia device 200 according to embodiments of the present disclosure may collectively output all channels capable of being acquired from various sources (analog radio broadcasting, Internet radio broadcasting, DMB, etc.) at the same time.

The multimedia device 200 may output a specific channel of a user-desired source to be audibly output, through the speaker 222 or the earphone.

The multimedia device 200 may provide the passenger with a source-channel to be used for displaying filtered subtitles through EPG information. The passenger may select a plurality of desired channels from among subtitle-displayable channels, such that subtitles of the desired channels may be displayed on the display 230.

Therefore, the passenger may simultaneously obtain broadcast programs output from different sources.

In another example, the passenger may view subtitles of a broadcast program through the display 230 while simultaneously listening to CD or USB music owned by the passenger.

As is apparent from the above description, a multimedia device, a vehicle including the same, and a broadcast listening method of the multimedia device according to the embodiments of the present disclosure may divisionally output a plurality of audio information through a speaker and a display. Therefore, when using a broadcast service (e.g., a radio broadcast service) capable of providing only audio information, passengers may simultaneously read and listen to broadcast information of two or more channels. In addition, the multimedia device may analyze a channel, broadcast information of which can be easily converted into text data, on the basis of electronic program guide (EPG) broadcast information, and may provide the passengers with subtitles of the analyzed channel, resulting in increased accuracy of the subtitles.

Although certain embodiments of the present disclosure have been shown and described, it would be appreciated by those skilled in the art that changes may be made in these embodiments without departing from the principle and spirit of the invention, the scope of which is defined in the claims and their equivalents.

What is claimed is:

1. A multimedia device of a vehicle comprising:
   a broadcast receiver configured to receive broadcast information of a plurality of channels from a radio signal;
   a controller configured to convert the radio signal into a digital signal, and simultaneously output a sound of a first channel, which is one of the plurality of channels, and a subtitle information of a second channel, which is text data, which is converted from the digital signal using at least one of a sound model, a silence separation model, and a language model;
   a sound outputter configured to output the sound of the first channel; and
   a display configured to display the subtitle information of the second channel,
   wherein the controller is further configured to determine electronic program guide (EPG) information of the radio signal, and to control the display so as to display a text-changeable channel according to the EPG information,
   wherein the second channel is comprised in the text-changeable, and
   wherein the controller is further configured to:
   convert the radio signal as a phonetic signal into the digital signal;
   convert the digital signal into a phonetic signal;
   search for a silent portion of the phonetic signal;
   isolate words and sentences from one another in the phonetic signal according to the search for the silent portion of the phonetic signal;
   collect the phonetic signal, isolated words, and isolated sentences into one phonetic datum;
   convert the phonetic datum into the text data using the EPG information; and
   output the text data via the display.

2. The multimedia device according to claim 1, wherein the broadcast receiver includes:
a multi-radio tuner configured to receive the EPG information from the radio signal; and
a communication modem configured to receive EPG broadcast information from a server when the EPG information is not present in the radio signal.

3. The multimedia device according to claim 2, wherein the multi-radio tuner includes a plurality of radio tuners configured to receive/output a radio signal corresponding to a selected channel through an antenna.

4. The multimedia device according to claim 3, wherein the communication modem receives EPG information regarding all current broadcast channels from the server over wireless network.

5. The multimedia device according to claim 1, wherein the sound outputter includes a speaker or an earphone terminal.

6. The multimedia device according to claim 5, wherein the display includes:
a front-seat display installed at a front of the vehicle; and/or
a rear-seat display installed at a rear of the vehicle.

7. The multimedia device according to claim 6, further comprising:
an inputter configured to select a specific channel displayed on the display,
wherein the controller is further configured to analyze broadcast information of all channels other than the selected channel while the sound outputter simultaneously outputs sound information of the selected channel.

8. The multimedia device according to claim 7, wherein:
when the text-changeable channel is selected by a user through the inputter, the controller is further configured to convert a sound signal received from the selected channel into text data, and to control the display so as to sequentially display the text data.

9. A vehicle comprising:
a broadcast receiver configured to receive broadcast information of a plurality of channels from a radio signal;
a controller configured to divide the received broadcast information into sound information and subtitle information, and to simultaneously output the sound and subtitle information; a controller configured to simultaneously output a sound of a first channel, which is one of the plurality of channels, and a subtitle information of a second channel, which is another of the plurality of channels;
a sound outputter configured to output the divided the sound information of the first channel; and
a display configured to display the divided the subtitle information of the second channel,
wherein the controller is further configured to determine electronic program guide (EPG) information of the radio signal, and to control the display so as to display a text-changeable channel according to the EPG information,
wherein the second channel is comprised in the text-changeable channel, and
wherein the controller is further configured to:
convert the radio signal as a phonetic signal into the digital signal;
convert the digital signal into a phonetic signal;
search for a silent portion of the phonetic signal;
isolate words and sentences from one another in the phonetic signal according to the search for the silent portion of the phonetic signal;
collect the phonetic signal, isolated words, and isolated sentences into one phonetic datum;
convert the phonetic datum into the text data using the EPG information; and
output the text data via the display.

10. The vehicle according to claim 9, wherein the broadcast receiver includes:
a multi-radio tuner configured to receive the EPG information from the radio signal; and
a communication modem configured to receive EPG broadcast information from a server when the EPG information is not present in the radio signal.

11. The vehicle according to claim 10, wherein the communication modem receives EPG information regarding all current broadcast channels from the server over wireless network.

12. The vehicle according to claim 9, wherein the sound outputter includes a speaker or an earphone terminal.

13. The vehicle according to claim 9, wherein the display includes:
a front-seat display installed at a front of the vehicle; and/or
a rear-seat display installed at a rear of the vehicle.

14. A method for controlling a multimedia device of a vehicle comprising:
receiving broadcast information of a plurality of channels from a radio signal via a broadcast receiver;
converting the radio signal into a digital signal;
dividing the received broadcast information into a sound of a first channel, which is one of the plurality of channels, and a subtitle information of a second channel, which is text data, which is converted from the digital signal using at least one of a sound model, a silence separation model, and a language model;
simultaneously outputting the sound and subtitle information;
outputting the sound of the first channel via a sound outputter;
displaying the subtitle of the second channel via a display;
determining electronic program guide (EPG) information of the radio signal; and
displaying a text-changeable channel according to the EPG information via the display, wherein the second channel is comprised in the text-changeable channel;
wherein the converting of the digital signal into the text data includes:
converting the radio signal as a phonetic signal into the digital signal;
converting the digital signal into a phonetic signal;
searching for a silent portion of the phonetic signal;
isolating words and sentences from one another in the phonetic signal according to the search for the silent portion of the phonetic signal;
collecting the phonetic signal, isolated words, and isolated sentences into one phonetic datum;
converting the phonetic datum into the text data using the EPG information; and
outputting the text data via the display.

15. The method according to claim 14, wherein the receiving of the broadcast information comprises:
receiving the EPG information from the radio signal via a multi-radio tuner; and receiving EPG broadcast information from a server over a network when the EPG information is not present in the radio signal.

16. The method according to claim 14, further comprising:
   selecting a specific channel displayed via the display; and
   analyzing broadcast information of all channels other than the selected channel while simultaneously outputting the selected channel via the sound outputter.

17. The method according to claim 16, wherein:
   when the text-changeable channel is selected by a user via an inputter, converting a sound signal received from the selected channel into text data, and sequentially displaying the text data via the display.

* * * * *